(12) United States Patent
Shimizu et al.

(10) Patent No.: US 8,967,782 B2
(45) Date of Patent: Mar. 3, 2015

(54) NON-AQUEOUS INK AND METHOD OF PRODUCING SAME

(75) Inventors: Manami Shimizu, Ibaraki-ken (JP); Yoshifumi Watanabe, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 98 days.

(21) Appl. No.: 13/545,668

(22) Filed: Jul. 10, 2012

(65) Prior Publication Data

US 2013/0038658 A1 Feb. 14, 2013

(30) Foreign Application Priority Data

Aug. 10, 2011 (JP) ................. P2011-174845

(51) Int. Cl.
*C09D 11/324* (2014.01)
*B41J 2/21* (2006.01)
*C09D 11/32* (2014.01)
*C09D 11/36* (2014.01)

(52) U.S. Cl.
CPC .............. *C09D 11/324* (2013.01); *B41J 2/2107* (2013.01); *C09D 11/32* (2013.01); *C09D 11/36* (2013.01)
USPC ............................................ 347/100; 347/95

(58) Field of Classification Search
CPC ............ B41J 2/01; B41J 2/107; B41J 2/2107; C09D 11/36; C09D 11/322; C09D 11/324; C09D 11/037; C09D 17/005
USPC .......... 347/95–100; 523/160, 161; 106/31.13, 106/31.6, 31.65
See application file for complete search history.

(56) References Cited

U.S. PATENT DOCUMENTS

| | | | |
|---|---|---|---|
| 7,345,099 B2 * | 3/2008 | Takizawa et al. | 523/160 |
| 8,592,502 B2 * | 11/2013 | Hosoya et al. | 523/160 |
| 2002/0009682 A1 * | 1/2002 | Owaki et al. | 430/605 |
| 2006/0000385 A1 | 1/2006 | Aihara et al. | |
| 2010/0010148 A1 * | 1/2010 | Imai et al. | 524/522 |

FOREIGN PATENT DOCUMENTS

| | | |
|---|---|---|
| CN | 1715328 A | 1/2006 |
| CN | 101213263 A | 7/2008 |
| JP | 2001-200184 | 7/2001 |
| JP | 2008-274232 A | 11/2008 |
| WO | 2006/124774 A2 | 11/2006 |
| WO | WO 2011062028 A1 * | 5/2011 |

OTHER PUBLICATIONS

Office Action issued in Chinese Patent Application No. 201210285239.9 dated Dec. 19, 2013, six (6) pages.

* cited by examiner

*Primary Examiner* — Matthew Luu
*Assistant Examiner* — Rut Patel
(74) *Attorney, Agent, or Firm* — Nath, Goldberg & Meyer; Jerald L. Meyer; Katelyn J. Bernier

(57) ABSTRACT

A non-aqueous ink comprising a carbon black and a non-aqueous solvent is provided, wherein the carbon black comprises:
a carbon black (A) having a primary particle size of at least 18 nm but less than 30 nm, a DBP absorption of at least 80 $cm^3$/100 g but not more than 130 $cm^3$/100 g and a pH of at least 6.0 but not more than 9.0, and
a carbon black (B) having a primary particle size of at least 30 nm but not more than 50 nm, a DBP absorption of at least 40 $cm^3$/100 g but less than 80 $cm^3$/100 g and a pH of at least 6.0 but not more than 9.0.

5 Claims, No Drawings

NON-AQUEOUS INK AND METHOD OF PRODUCING SAME

CROSS REFERENCE TO RELATED APPLICATIONS

This Application is based upon and claims the benefit of priority from prior Japanese Patent Applications No. 2011-174845 filed on Aug. 10, 2011, the entire contents of which are incorporated by reference herein.

BACKGROUND OF THE INVENTION

1. Field of the Invention

The present invention relates to a non-aqueous ink, a printing method that uses the ink, and a method of producing the ink.

2. Description of the Related Art

An inkjet recording system is a printing system in which printing is conducted by spraying a liquid ink with a high degree of fluidity from very fine nozzles, and adhering the ink to a recording medium such as a sheet of paper. These systems enable the printing of high-resolution, high-quality images at high speed and with minimal noise, using a comparatively inexpensive printing apparatus, and are rapidly becoming widespread.

Coloring materials for inks can be broadly classified into materials that use pigments and materials that use dyes. Of these, there is a growing tendency for the use of inks that use pigments as the coloring materials, as such inks exhibit the excellent levels of light resistance, weather resistance and water resistance that are required for high image quality printing.

In terms of the solvent, inks can be broadly classified into aqueous inks and non-aqueous inks. Non-aqueous inks that do not use water as the ink solvent, including solvent-based inks that use a volatile solvent as the main constituent and oil-based inks that use a non-volatile solvent as the main constituent, exhibit superior stability within the printer (such as intermittent dischargeability and discharge recovery following standing idle for a long period), cause no curling of the printed paper and have a short ink penetration and drying time, and are therefore attracting considerable attention.

In an inkjet recording system, the nozzle plate of the print head is frequently subjected to an ink repellent treatment using a fluorine-based process or the like, but because non-aqueous inks exhibit comparatively superior wettability of the nozzle plate, the nozzle plate tends to be wet comparatively easily by the ink. When ink adheres to the nozzle plate, the adhered ink hinders the discharge of ink droplets, and can cause problems such as discharge failure and discharge bending. Moreover, the adhered ink may also drip onto the paper, causing staining of the printed image.

Further, because the print head nozzles used in an inkjet recording system have very fine diameters and can sometimes become blocked, a cleaning mechanism is usually installed within the system. In one example of the cleaning mechanism, a small amount of ink is discharged, and a wiping blade is then used to wipe the surface of the nozzle plate. In this mechanism, because the ink is wiped off using the wiping blade, abrasion of the nozzle plate may cause a deterioration in the ink repellency of the nozzle plate, which can lead to the types of discharge faults described above.

Patent Document 1 discloses that by adding a salt of a long-chain polyamide and a polar acid ester, in an amount of at least 1% by mass relative to the total mass of the ink, to an oil-based inkjet ink comprising an ester-based solvent as the solvent, wetting of the nozzle plate by the ink can be inhibited. However, the Patent Document 1 includes no investigation of the deterioration in ink repellency caused by cleaning. Further, when a salt of a long-chain polyamide and a polar acid ester is added to an ink, the penetration of the ink into paper is accelerated, which may cause a reduction in the print density.

Moreover, in the case of a non-aqueous ink, the ink requires not only good wiping durability for the nozzle plate, but also requires a high print density and superior storage stability.

[Patent Document 1] JP 2008-274232 A

An object of the present invention is to provide a non-aqueous ink that exhibits excellent wiping durability for the nozzle plate, excellent storage stability, and superior print density, as well as providing a printing method that uses the ink and a method of producing the ink.

SUMMARY OF THE INVENTION

A first aspect of the present invention provides a non-aqueous ink comprising a carbon black and a non-aqueous solvent, wherein the carbon black comprises a carbon black (A) having a primary particle size of at least 18 nm but less than 30 nm, a DBP absorption of at least 80 $cm^3/100$ g but not more than 130 $cm^3/100$ g and a pH of at least 6.0 but not more than 9.0, and a carbon black (B) having a primary particle size of at least 30 nm but not more than 50 nm, a DBP absorption of at least 40 $cm^3/100$ g but less than 80 $cm^3/100$ g and a pH of at least 6.0 but not more than 9.0.

Another aspect of the present invention provides a printing method, comprising printing the aforementioned non-aqueous ink using an inkjet recording method.

Yet another aspect of the present invention provides a method of producing a non-aqueous ink, the method comprising a step of mixing a carbon black (A) having a primary particle size of at least 18 nm but less than 30 nm, a DBP absorption of at least 80 $cm^3/100$ g but not more than 130 $cm^3/100$ g and a pH of at least 6.0 but not more than 9.0, a carbon black (B) having a primary particle size of at least 30 nm but not more than 50 nm, a DBP absorption of at least 40 $cm^3/100$ g but less than 80 $cm^3/100$ g and a pH of at least 6.0 but not more than 9.0, and a non-aqueous solvent.

DETAILED DESCRIPTION OF THE EMBODIMENTS

A description of embodiments according to the present invention is presented below, but the examples within these embodiments in no way limit the scope of the present invention.

A non-aqueous ink according to one embodiment of the present invention (hereinafter also referred to as simply "the ink") comprises a carbon black and a non-aqueous solvent, wherein the carbon black comprises a carbon black (A) having a primary particle size of at least 18 nm but less than 30 nm, a DBP absorption of at least 80 $cm^3/100$ g but not more than 130 $cm^3/100$ g and a pH of at least 6.0 but not more than 9.0, and a carbon black (B) having a primary particle size of at least 30 nm but not more than 50 nm, a DBP absorption of at least 40 $cm^3/100$ g but less than 80 $cm^3/100$ g and a pH of at least 6.0 but not more than 9.0. As a result, a non-aqueous ink can be provided that exhibits excellent wiping durability for the nozzle plate, excellent storage stability and superior print density.

In non-aqueous inks, a high print density can usually be obtained by using a carbon black having a small primary particle size and a large structure. However, investigations by the inventors of the present invention revealed that one of the reasons that the ink repellency of the nozzle plate is reduced by head cleaning is that the carbon black within the ink adhered to the nozzle plate acts as an abrasive, causing scratching of the nozzle plate surface as a result of the wiping action. Moreover, the inventors also discovered that the ink repellency of the nozzle plate decreased more as the primary particle size of the carbon black was reduced.

Further, in non-aqueous inks, by using an acidic carbon black, favorable storage stability can usually be achieved even if the primary particle size is small and the structure is large. However, investigations by the inventors of the present invention revealed that when an acidic carbon black is used, the affinity between the carbon black and the nozzle plate during wiping increased the likelihood of scratching of the nozzle plate surface. Accordingly, in the present embodiment, this abrasive action is inhibited by using a neutral carbon black having a pH of at least 6.0 but not more than 9.0. It was discovered that this abrasive action is caused not by the pH of the overall ink, but rather by the functional group portions adsorbed to the carbon black, and that controlling the pH of the carbon black was therefore effective in inhibiting the abrasive action.

Furthermore, with a neutral carbon black, and particularly a carbon black having a small primary particle size, the dispersion stability may deteriorate, making it difficult to achieve satisfactory storage stability, but the inventors of the present invention discovered that by also including a carbon black having a large primary particle size and a small structure, favorable storage stability could be maintained.

In other words, in those cases where a neutral carbon black is used to obtain superior wiping durability for the nozzle plate, a carbon black (A) having a small primary particle size and a large structure is preferably included to obtain a high print density, and a carbon black (B) having a large primary particle size and a small structure is preferably included to ensure that excellent storage stability is achieved.

Observation of carbon black using an electron microscope or the like reveals a structure containing aggregates in which a plurality of spherical particles are linked together. These spherical particles are the primary particles, and the size of the particles is represented by the primary particle size. The aggregates represent the structure, and the size of the structure is represented by the DBP (dibutyl phthalate) absorption value.

The primary particle size of a carbon black can be determined as an arithmetic mean diameter, which is obtained by observing the primary particles using an electron microscope. Generally, a small primary particle size for the carbon black yields a high print density, whereas a large primary particle size yields excellent dispersion stability of the carbon black within the ink.

The DBP absorption value for a carbon black can be determined as the amount of DBP absorbed by 100 g of the carbon black (JIS K6221). The DBP absorption generally increases as the structure becomes more developed.

Functional groups such as carboxyl groups, lactone groups, phenol groups and quinone groups exist at the surface of a carbon black, and the surface properties of the carbon black vary depending on the amounts and relative composition of these functional groups. These surface properties can be measured indirectly by measuring the pH. The pH of a carbon black can be determined in accordance with JIS K5101, by measuring the pH of a mixed liquid containing the carbon black and distilled water.

It is generally thought that, in a non-aqueous ink, resins and pigment dispersants within the ink adsorb to the carbon black via acid-base interactions, and the steric hindrance produced by the adsorbed resins and pigment dispersants stabilizes the dispersibility within the ink. Carbon blacks are typically within a range from neutral to weakly alkaline, but in order to enhance the acid-base interactions and improve the pigment dispersibility, an acidic treatment is often performed to introduce high-polarity functional groups. However, carbon blacks that have undergone acidic treatment are more likely to scratch the nozzle plate, and may reduce the wiping durability of the nozzle plate. Accordingly, in the present embodiment, the pH levels of the carbon blacks (A) and (B) are set to at least 6.0 but not more than 9.0.

Carbon blacks having a pH of at least 6.0 but not more than 9.0 may be selected appropriately from among carbon blacks produced using any of various production methods in which the amount of acidic treatment is minimal or in which an acidic treatment is not performed. Further, the pH may be adjusted to a value of at least 6.0 but not more than 9.0 by altering the amount of acidic treatment performed within the production process.

The carbon blacks may be selected from among furnace black, lamp black, acetylene black, channel black, thermal black and ketchen black.

The primary particle size of the carbon black (A) is at least 18 nm but less than 30 nm. This primary particle size is more preferably at least 20 nm, and still more preferably 22 nm or greater. Further, this primary particle size is more preferably not more than 28 nm, and still more preferably 26 nm or smaller.

The DBP absorption of the carbon black (A) is at least 80 $cm^3/100$ g but not more than 130 $cm^3/100$ g. This DBP absorption is more preferably at least 90 $cm^3/100$ g, and still more preferably 100 $cm^3/100$ g or greater. Further, this DBP absorption value is more preferably not more than 125 $cm^3/100$ g, and still more preferably 115 $cm^3/100$ g or less.

Ensuring that the primary particle size and the DBP absorption value satisfy the respective ranges described above yields a carbon black (A) that has a small primary particle size and a large structure, and as a result, a high print density and excellent storage stability can be achieved. If the primary particle size is too small and the structure is too large, then the storage stability may deteriorate, whereas if the primary particle size is too large and the structure is too small, then a satisfactory print density may be unobtainable, and therefore values that satisfy the above ranges are preferred.

The pH of the carbon black (A) is at least 6.0 but not more than 9.0, is more preferably within a range from 7.0 to 9.0, and is still more preferably from 7.0 to 8.0. By ensuring that the pH is at least 6.0, deterioration of the nozzle plate caused by abrasion by the carbon black can be prevented, whereas ensuring that the pH is not more than 9.0 enables the storage stability to be favorably maintained.

The primary particle size of the carbon black (B) is at least 30 nm but not more than 50 nm. This primary particle size is more preferably at least 33 nm, and still more preferably 35 nm or greater. Further, this primary particle size is more preferably not more than 45 nm, and still more preferably 40 nm or smaller.

The DBP absorption of the carbon black (B) is at least 40 $cm^3/100$ g but less than 80 $cm^3/100$ g. This DBP absorption is more preferably at least 43 $cm^3/100$ g, and still more preferably 45 $cm^3/100$ g or greater. Further, this DBP absorption value is more preferably not more than 70 $cm^3/100$ g, and still more preferably 66 $cm^3/100$ g or less.

Ensuring that the primary particle size and the DBP absorption value satisfy the respective ranges described above yields a carbon black (B) that has a large primary particle size and a small structure. By using this carbon black (B) in combination with the carbon black (A), the storage stability, which tends to be problematic when the carbon black (A) is used alone, can be improved. In other words, because the carbon black (A) is neutral and has a small primary particle size, it tends to be prone to deterioration in the storage stability, but by using the carbon black (B), which is also neutral but has a larger primary particle size, in combination with the carbon black (A), the storage stability can be improved. Moreover, because the carbon black (B) has a large primary particle size, scratching of the nozzle plate is unlikely, meaning the wiping durability of the nozzle plate can be improved.

The pH of the carbon black (B) is at least 6.0 but not more than 9.0, is more preferably within a range from 7.0 to 9.0, and is still more preferably from 7.0 to 8.0. By ensuring that the pH is at least 6.0, deterioration of the nozzle plate caused by abrasion by the carbon black can be prevented, whereas ensuring that the pH is not more than 9.0 enables the storage stability to be favorably maintained.

The non-aqueous ink may also include other coloring materials besides the carbon blacks (A) and (B), provided the effects of the present invention are not impaired. Pigments and/or dyes can be used as the other coloring materials, and a carbon black other than the carbon blacks (A) and (B) may be used as a pigment.

There are no particular limitations on other pigments that may be used, and any organic pigment or inorganic pigment that is used in the technical field of printing can be used. Specific examples of other pigments that may be used in combination with the carbon blacks include other carbon blacks, cadmium red, chrome yellow, cadmium yellow, chrome oxide, viridian, titanium cobalt green, ultramarine blue, Prussian blue, cobalt blue, azo-based pigments, phthalocyanine-based pigments, quinacridone-based pigments, isoindolinone-based pigments, dioxazine-based pigments, threne-based pigments, perylene-based pigments, thioindigo-based pigments, quinophthalone-based pigments and metal complex pigments.

There are no particular limitations on the dyes that may be used in combination with the carbon blacks, and examples include azo dyes, metal complex dyes, naphthol dyes, anthraquinone dyes, indigo dyes, carbonium dyes, quinoneimine dyes, xanthene dyes, cyanine dyes, quinoline dyes, nitro dyes, nitroso dyes, benzoquinone dyes, naphthoquinone dyes, phthalocyanine dyes and metal phthalocyanine dyes.

The total amount of pigments within the ink is typically within a range from 0.01 to 20% by mass, and from the viewpoints of print density and ink viscosity, is preferably within a range from 1 to 15% by mass, and more preferably from 5 to 10% by mass. Other pigments besides the carbon blacks (A) and (B) preferably represent not more than 20% by mass, and more preferably 10% by mass or less, of the total amount of pigments.

The mass ratio between the carbon black (A) and the carbon black (B) is preferably within a range from 9:1 to 4:6, and is more preferably within a range from 6:4 to 5:5. Increasing the mass ratio of the carbon black (A) tends to enhance the print density, whereas increasing the mass ratio of the carbon black (B) tends to improve the wiping durability of the nozzle plate.

In order to improve the dispersion of the pigments including the carbon blacks (A) and (B) within the non-aqueous ink, a pigment dispersant is preferably added to the non-aqueous ink. There are no particular limitations on the pigment dispersant, provided it is able to stably disperse the pigment within the solvent, and examples include hydroxyl group-containing carboxylic acid esters, salts of long-chain polyaminoamides and high-molecular weight acid esters, salts of high-molecular weight polycarboxylic acids, salts of long-chain polyaminoamides and polar acid esters, high-molecular weight unsaturated acid esters, high-molecular weight copolymers, modified polyurethanes, modified polyacrylates, polyetherester anionic surfactants, naphthalenesulfonic acid formalin condensate salts, polyoxyethylene alkyl phosphate esters, polyoxyethylene nonylphenyl ethers, polyester polyamines and stearylamine acetate, and of these, the use of a polymer dispersant is particularly desirable.

Specific examples of the pigment dispersant include Solsperse 5000 (a phthalocyanine ammonium salt-based dispersant), 13940 (a polyester amine-based dispersant), 17000 and 18000 (aliphatic amine-based dispersants), and 11200, 22000, 24000 and 28000 (all product names) manufactured by Lubrizol Japan Ltd., Efka 400, 401, 402, 403, 450, 451 and 453 (modified polyacrylates), and 46, 47, 48, 49, 4010 and 4055 (modified polyurethanes) (all product names) manufactured by Efka Chemicals BV, Demol P and EP, Poiz 520, 521 and 530, and Homogenol L-18 (polycarboxylate polymeric surfactants) (all product names) manufactured by Kao Corporation, Disparlon KS-860 and KS-873N4 (high-molecular weight polyester amine salts) (all product names) manufactured by Kusumoto Chemicals, Ltd., and Discol 202, 206, OA-202 and OA-600 (multi-chain polymeric nonionic dispersants) (all product names) manufactured by Dai-ichi Kogyo Seiyaku Co., Ltd.

Of the above pigment dispersants, a polyamide-based dispersant that has a comb-like structure comprising a plurality of side chains each composed of a polyester chain is preferably used. This polyamide-based dispersant having a comb-like structure comprising a plurality of side chains each composed of a polyester chain is a compound having a main chain containing a plurality of nitrogen atoms, such as a polyethyleneimine, and having a plurality of side chains bonded to the nitrogen atoms via amide linkages, wherein the side chains are polyester chains. Examples include dispersants with a structure having a main chain composed of a polyalkyleneimine such as polyethyleneimine, to which 3 to 80 poly(carbonyl-$C_3$-$C_6$-alkyleneoxy) chains are bonded as side chains via amide linkages per molecule, as disclosed in JP 05-177123 A. The above-mentioned products Solsperse 11200 and Solsperse 28000 (both product names) manufactured by Lubrizol Japan Ltd. are polyamide-based dispersants having the type of comb-shaped structure described above.

The amount of the pigment dispersant within the ink may be set as appropriate, but from the viewpoint of pigment dispersibility, the amount of the pigment dispersant is preferably within a range from approximately 0.05 to 1.5 parts by mass, and more preferably from 0.1 to 1.3 parts by mass, per 1 part by mass of the pigment. Relative to the total mass of the ink, the pigment dispersant content is preferably within a range from approximately 0.5 to 15% by mass, and more preferably from 1 to 12% by mass.

The "non-aqueous solvent" refers to non-polar organic solvents and polar organic solvents for which the 50% distillation point is at least 150° C. The 50% distillation point is measured in accordance with JIS K0066 "Test Methods for Distillation of Chemical Products" and represents the temperature at which 50% by mass of the solvent has volatilized. From the viewpoint of safety, the 50% distillation point of the non-aqueous solvent is preferably 160° C. or higher, and more preferably 230° C. or higher.

Examples of preferred non-polar organic solvents include petroleum-based solvents such as aliphatic hydrocarbon solvents, alicyclic hydrocarbon solvents and aromatic hydrocarbon solvents. Specific examples of preferred aliphatic hydrocarbon solvents and alicyclic hydrocarbon solvents include Teclean N-16, Teclean N-20, Teclean N-22, Nisseki Naphtesol L, Nisseki Naphtesol M, Nisseki Naphtesol H, No. 0 Solvent L, No. 0 Solvent M, No. 0 Solvent H, Nisseki Isosol 300, Nisseki Isosol 400, AF-4, AF-5, AF-6 and AF-7, all manufactured by JX Nippon Oil & Energy; Isopar G, Isopar H, Isopar L, Isopar M, Exxsol D40, Exxsol D80, Exxsol D100, Exxsol D130 and Exxsol D140, all manufactured by Exxon Mobil Corporation; and Normal Paraffin H manufactured by Japan Energy Corporation. Specific examples of preferred aromatic hydrocarbon solvents include Nisseki Cleansol G (alkylbenzene) manufactured by JX Nippon Oil & Energy and Solvesso 200 manufactured by Exxon Mobil Corporation.

Examples of solvents that can be used as the polar organic solvent include ester-based solvents, alcohol-based solvents, higher fatty acid-based solvents, ether-based solvents, and mixed solvents thereof. For example, one or more solvents selected from the group consisting of ester-based solvents composed of an ester of a higher fatty acid of 8 to 20 carbon atoms and an alcohol of 1 to 24 carbon atoms, higher alcohols of 8 to 24 carbon atoms, and higher fatty acids of 8 to 20 carbon atoms can be used favorably.

Specific examples of preferred polar organic solvents include ester-based solvents such as methyl laurate, isopropyl laurate, isopropyl myristate, isooctyl myristate, isopropyl palmitate, isostearyl palmitate, methyl oleate, ethyl oleate, isopropyl oleate, butyl oleate, methyl linoleate, isobutyl linoleate, ethyl linoleate, isopropyl isostearate, methyl soybean oil, isobutyl soybean oil, methyl tallate, isobutyl tallate, diisopropyl adipate, diisopropyl sebacate, diethyl sebacate, propylene glycol monocaprate, trimethylolpropane tri-2-ethylhexanoate and glyceryl tri-2-ethylhexanoate; alcohol-based solvents such as isomyristyl alcohol, isopalmityl alcohol, isostearyl alcohol, oleyl alcohol, hexyldecanol, octyldodecanol and decyltetradecanol; higher fatty acid-based solvents such as nonanoic acid, isononanoic acid, isomyristic acid, hexadecanoic acid, isopalmitic acid, oleic acid and isostearic acid; and ether-based solvents such as diethylene glycol monobutyl ether, ethylene glycol monobutyl ether, propylene glycol monobutyl ether and propylene glycol dibutyl ether.

These non-aqueous solvents may be used individually, or two or more solvents may be used in combination.

In the present embodiment, from the viewpoint of achieving superior wiping durability for the nozzle plate, the non-aqueous solvent preferably comprises an alcohol-based solvent, and more preferably comprises an alcohol-based solvent of 10 to 24 carbon atoms. Specific examples of alcohol-based solvents of 10 to 24 carbon atoms include isomyristyl alcohol (14 carbon atoms), isocetyl alcohol (16 carbon atoms), isostearyl alcohol and oleyl alcohol (18 carbon atoms), as well as dimerized alcohols produced by the Guerbet reaction or the like. The amount of the alcohol-based solvent preferably represents at least 1% by mass, and more preferably 5% by mass or more, but preferably not more than 40% by mass, and more preferably 20% by mass or less, of the total mass of the non-aqueous solvent.

Appropriate amounts of nozzle blockage prevention agents, antioxidants, conductivity modifiers, viscosity modifiers, surface tension modifiers, oxygen absorbers, fixing agents, preservatives, and surfactants and the like may also be added to the non-aqueous ink of the present invention, provided such addition does not impair the effects of the present invention. There are no particular restrictions on the types of these additives, and those materials typically used within this field may be used.

A method of producing a non-aqueous ink of the present embodiment comprises a step of mixing a carbon black (A) having a primary particle size of at least 18 nm but less than 30 nm, a DBP absorption of at least 80 $cm^3/100$ g but not more than 130 $cm^3/100$ g and a pH of at least 6.0 but not more than 9.0, a carbon black (B) having a primary particle size of at least 30 nm but not more than 50 nm, a DBP absorption of at least 40 $cm^3/100$ g but less than 80 $cm^3/100$ g and a pH of at least 6.0 but not more than 9.0, and a non-aqueous solvent. This method enables a non-aqueous ink to be obtained that exhibits excellent wiping durability for the nozzle plate, excellent storage stability, and superior print density. The carbon blacks (A) and (B) and the non-aqueous solvent are as described above.

In one example of the above production method, all of the components including the coloring materials and the non-aqueous solvent are added to a dispersion device such as a beads mill, either in a single batch or in portions, the components are then stirred and mixed, and if desired, the resulting mixture may then be filtered through a membrane filter or the like. For example, the non-aqueous ink can be prepared by first uniformly mixing a portion of the non-aqueous solvent with the total mass of coloring materials to prepare a mixed liquid, dispersing this mixed liquid in a dispersion device, subsequently adding the remaining components to the resulting dispersion, and then passing the resulting ink through a filter.

There are no particular restrictions on the printing method that uses the non-aqueous ink, and printing may be conducted using an inkjet recording method. The inkjet recording method may employ any of various printing systems, including a piezo system, electrostatic system or thermal system. In those cases where an inkjet recording apparatus is used, the ink according to the present embodiment is preferably discharged from the inkjet head based on a digital signal, and the discharged ink droplets are then adhered to a recording medium.

In those cases where the non-aqueous ink is used as an inkjet recording non-aqueous ink, the ideal range for the viscosity of the ink varies depending on factors such as the diameter of the nozzles within the discharge head and the discharge environment, but at 23° C., is preferably within a range from 5 to 30 mPa·s, more preferably from 5 to 15 mPa·s, and most preferably approximately 10 mPa·s. Here, the term "viscosity" describes a value measured at 23° C. by raising the shear stress from 0 Pa at a rate of 0.1 Pa/s, and refers to the measured value at 10 Pa.

There are no particular limitations on the recording medium, and examples of media that may be used include plain paper, high-quality plain paper, inkjet (IJ) paper, IJ matte paper, coated paper in which the recording medium has been coated with an ink-absorbing solution, fine coated paper in which the ink-absorbing layer is thinner than that of a coated paper, glossy paper (photo glossy paper), special paper, and fabric.

The present invention is able to provide a non-aqueous ink that exhibits excellent wiping durability for the nozzle plate, excellent storage stability, and superior print density, as well as providing a printing method that uses the ink and a method of producing the ink.

EXAMPLES

A more detailed description of the present invention is provided below based on a series of examples, but the present invention is in no way limited by these examples.

<Ink Preparation>

Inks were prepared using the formulations shown in Table 1 and Table 2. The various components were premixed in the ratios shown in Table 1 and Table 2, and in each case, 35 g of the resulting mixed liquid was placed in a glass container, 100 g of zirconia beads (diameter: 0.5 mm) were added, and the mixed liquid was dispersed for 2 hours at a frequency of 65 Hz using a rocking mill (model: RMO5S, manufactured by Seiwa Giken Co., Ltd.) to complete preparation of the ink.

The components shown in Table 1 and Table 2 are as listed below. Details regarding the carbon blacks shown in Table 1 and Table 2 are shown in Table 3.

Solsperse 11200: "Solsperse 11200", manufactured by Lubrizol Japan Ltd.

Methyl oleate: a higher fatty acid ester-based solvent, "Exceparl M-OL", manufactured by Kao Corporation.

Isomyristyl alcohol: a higher alcohol-based solvent, "FOC140N", manufactured by Nissan Chemical Industries, Ltd.

AF6: a petroleum-based hydrocarbon solvent, "AF Solvent No. 6", manufactured by JX Nippon Oil & Energy.

TABLE 1

Ink formulations of examples and evaluation results

| | Mass % | Example 1 | Example 2 | Example 3 | Example 4 | Example 5 | Example 6 | Example 7 |
|---|---|---|---|---|---|---|---|---|
| Carbon black | A-1 | 4 | 7.2 | 3.2 | — | — | 4 | 4 |
| | A-2 | — | — | — | 4 | — | — | — |
| | A-3 | — | — | — | — | 4 | — | — |
| | B-1 | 4 | 0.8 | 4.8 | — | — | 4 | 4 |
| | B-2 | — | — | — | 4 | — | — | — |
| | B-3 | — | — | — | — | 4 | — | — |
| Dispersant | Solsperse 11200 | 10 | 10 | 10 | 10 | 10 | 10 | 10 |
| Non-aqueous solvent | Methyl oleate | 34 | 34 | 34 | 34 | 34 | 52 | — |
| | Isomyristyl alcohol | 18 | 18 | 18 | 18 | 18 | — | — |
| | AF6 | 30 | 30 | 30 | 30 | 30 | 30 | 82 |
| Total | | 100 | 100 | 100 | 100 | 100 | 100 | 100 |
| Carbon black (A):(B) (mass ratio) | | 5:5 | 9:1 | 4:6 | 5:5 | 5:5 | 5:5 | 5:5 |
| Results of evaluations | Wiping durability | AA | A | AA | A | A | A | A |
| | Print density | A | AA | A | A | A | A | A |
| | Storage stability | A | A | A | A | A | A | A |

TABLE 2

Ink formulations of comparative examples and evaluation results

| | Mass % | Comparative example 1 | Comparative example 2 | Comparative example 3 | Comparative example 4 | Comparative example 5 | Comparative example 6 | Comparative example 7 | Comparative example 8 |
|---|---|---|---|---|---|---|---|---|---|
| Carbon black | A-1 | 8 | — | — | 4 | — | — | — | — |
| | B-1 | — | 8 | — | — | 4 | — | — | — |
| | C-1 | — | — | 8 | — | — | 4 | — | — |
| | C-2 | — | — | — | — | — | 4 | — | — |
| | C-3 | — | — | — | — | — | — | — | — |
| | C-4 | — | — | — | — | — | — | 4 | — |
| | C-5 | — | — | — | 4 | — | — | — | 4 |
| | C-6 | — | — | — | — | 4 | — | 4 | — |
| | C-7 | — | — | — | — | — | — | — | 4 |
| Dispersant | Solsperse 11200 | 10 | 10 | 10 | 10 | 10 | 10 | 10 | 10 |
| Non-aqueous solvent | Methyl oleate | 34 | 34 | 34 | 34 | 34 | 34 | 34 | 34 |
| | Isomyristyl alcohol | 18 | 18 | 18 | 18 | 18 | 18 | 18 | 18 |
| | AF6 | 30 | 30 | 30 | 30 | 30 | 30 | 30 | 30 |
| Total | | 100 | 100 | 100 | 100 | 100 | 100 | 100 | 100 |
| Results of evaluations | Wiping durability | B | AA | C | B | A | C | A | A |
| | Print density | AA | C | A | A | C | C | C | C |
| | Storage stability | C | A | A | C | A | A | B | B |

TABLE 3

Details of carbon blacks

| | | Type | Manufacturer | Primary particle size (nm) | DBP absorption (cm$^3$/100 g) | pH |
|---|---|---|---|---|---|---|
| Carbon black (A) | A-1 | #40 | Mitsubishi Chemical Corporation | 24 | 110 | 8.0 |
| | A-2 | #650 | Mitsubishi Chemical Corporation | 22 | 114 | 7.5 |
| | A-3 | #7350/F | Tokai Carbon Co., Ltd. | 28 | 106 | 7.0 |

TABLE 3-continued

Details of carbon blacks

|  |  | Type | Manufacturer | Primary particle size (nm) | DBP absorption (cm³/100 g) | pH |
|---|---|---|---|---|---|---|
| Carbon black (B) | B-1 | #95 | Mitsubishi Chemical Corporation | 40 | 66 | 8.0 |
|  | B-2 | #85 | Mitsubishi Chemical Corporation | 40 | 48 | 7.5 |
|  | B-3 | #7270SB | Tokai Carbon Co., Ltd. | 36 | 62 | 7.5 |
| Other carbon black | C-1 | MA100 | Mitsubishi Chemical Corporation | 24 | 100 | 3.5 |
|  | C-2 | MA220 | Mitsubishi Chemical Corporation | 55 | 93 | 3.0 |
|  | C-3 | MA7 | Mitsubishi Chemical Corporation | 24 | 66 | 3.0 |
|  | C-4 | #52 | Mitsubishi Chemical Corporation | 27 | 63 | 8.0 |
|  | C-5 | #44 | Mitsubishi Chemical Corporation | 24 | 78 | 8.0 |
|  | C-6 | #20 | Mitsubishi Chemical Corporation | 50 | 121 | 7.5 |
|  | C-7 | #7100F | Tokai Carbon Co., Ltd. | 42 | 110 | 7.0 |

In Table 3, the primary particle size represents the average particle diameter measured and calculated from an electron microscope image. Further, the DBP absorption value was determined in accordance with JIS K6217. The pH was determined in accordance with JIS K5101.

<Evaluations>

Using each of the above inks, the nozzle plate wiping durability, the print density and the storage stability were evaluated. The results are shown in Table 1 and Table 2.

(Nozzle Plate Wiping Durability)

Each of the above inks was mounted in an inkjet printer "Orphis X9050" (manufactured by Riso Kagaku Corporation), head cleaning was performed 4,000 times using the head maintenance "normal cleaning" function, and the portion of the nozzle plate contacted by the wiping blade was inspected visually for ink repellency. The ink repellency was evaluated against the criteria listed below. In "normal cleaning", the ink path is pressurized to discharge ink from the nozzles, and a rubber wiping blade is then used to wipe the ink off the nozzle surfaces.

AA: the ink repellency of the portion contacted by the wiping blade was maintained, and following head cleaning, the ink was repelled immediately.

A: the ink repellency of the portion contacted by the wiping blade was maintained, and following head cleaning, the ink was repelled within 20 seconds.

B: the ink repellency of part of the portion contacted by the wiping blade deteriorated.

C: the ink repellency of the entire portion contacted by the wiping blade deteriorated.

(Print Density)

Each of the above inks was mounted in an inkjet printer "Orphis X9050" (manufactured by Riso Kagaku Corporation), and the print density was evaluated by printing a solid image at 300×300 dpi onto plain paper (Riso lightweight paper, manufactured by Riso Kagaku Corporation). The surface OD value of the printed product having the solid image formed thereon was measured using an optical densitometer (RD920, manufactured by Macbeth Corporation), and then evaluated against the criteria listed below. The Orphis X9050 is a system that uses a line-type inkjet head, wherein the paper is transported in a sub-scanning direction perpendicular to the main scanning direction (the direction along which the nozzles are aligned) while printing is conducted.

AA: 1.15 or greater
A: at least 1.05 but less than 1.15
B: at least 0.95 but less than 1.05
C: less than 0.95

(Storage Stability)

Following measurement of the initial viscosity of each of the above inks, each ink was placed in a sealed container and left to stand for 1 week in an environment at 70° C. The viscosity of the ink was then remeasured, and the change in the viscosity ([(viscosity after 1 weeks×100)/(initial viscosity)]−100(%)) was determined and evaluated against the criteria listed below. The ink viscosity refers to the viscosity at 10 Pa when the shear stress was raised from 0 Pa at a rate of 0.1 Pa/s and at a temperature of 23° C., and was measured using a controlled stress rheometer RS75 manufactured by Haake GmbH (cone angle: 1°, diameter: 60 mm).

A: change in viscosity of less than ±2%
B: change in viscosity of at least ±2% but less than ±5%
C: change in viscosity of at least ±5%

As illustrated in Table 1 and Table 2, each of the inks of the examples exhibited favorable results for the nozzle plate wiping durability, the print density and the storage stability.

In the examples 1 to 3, the mass ratio between the carbon black (A) and the carbon black (B) differed, but each of the inks exhibited favorable results. As the amount of the carbon black (A) was increased, the print density improved, whereas as the amount of the carbon black (B) was increased, the nozzle plate wiping durability improved.

The examples 4 and 5 included carbon blacks (A) and (B) that were different from those of the example 1, but in each case, favorable results were obtained. In the example 1, it is thought that because the carbon blacks (A) and (B) had a comparatively large primary particle size, a greater improvement was achieved in the nozzle plate wiping durability.

The examples 6 and 7 included a different non-aqueous solvent from the example 1, but in each case, favorable results were obtained. It is thought that because the example 1 included isomyristyl alcohol within the non-aqueous solvent, a greater improvement was achieved in the nozzle plate wiping durability.

The comparative example 1 included only the carbon black (A), and a satisfactory result could not be obtained for the nozzle plate wiping durability or the storage stability. It is thought that because the primary particle size of the carbon black was small, the nozzle plate was prone to scratching, and because the structure was large, the dispersibility within the ink was poor.

The comparative example 2 included only the carbon black (B), and because the carbon black primary particle size was large, satisfactory print density could not be achieved.

The comparative example 3 included only the acidic carbon black C-1, but satisfactory nozzle plate wiping durability could not be achieved.

The comparative example 4 did not contain the carbon black (B), but rather included the carbon black (A) and another carbon black C-5, but because the primary particle size of both carbon blacks was small, a satisfactory result could not be obtained for the nozzle plate wiping durability or the storage stability.

The comparative example 5 did not contain the carbon black (A), but rather included the carbon black (B) and another carbon black C-6, but because the primary particle size of both carbon blacks was large, satisfactory print density could not be achieved.

Comparative example 6 included a combination of the other carbon blacks C-1 and C-2, but a satisfactory result could not be obtained for the nozzle plate wiping durability or the print density. It is thought that because both C-1 and C-2 were acidic, and because C-2 also had a comparatively large primary particle size, a satisfactory result could not be obtained for the nozzle plate wiping durability or the print density.

Comparative example 7 included a combination of the other carbon blacks C-4 and C-6, but a satisfactory result could not be obtained for the print density or the storage stability. It is thought that because the primary particle size of C-4 was small, the storage stability deteriorated. Further, it is also thought that because the primary particle size of C-6 was large, the print density deteriorated.

Comparative example 8 included a combination of the other carbon blacks C-5 and C-7, but a satisfactory result could not be obtained for the print density or the storage stability. It is thought that because the primary particle size of C-5 was small, the storage stability deteriorated. Further, it is also thought that because the primary particle size of C-7 was large, the print density deteriorated.

It is to be noted that, besides those already mentioned above, many modifications and variations of the above embodiments may be made without departing from the novel and advantageous features of the present invention. Accordingly, all such modifications and variations are intended to be included within the scope of the appended claims.

The invention claimed is:

1. A non-aqueous ink comprising a carbon black and a non-aqueous solvent, wherein the carbon black comprises:
    a carbon black (A) having a primary particle size of at least 18 nm but less than 30 nm, a DBP absorption of at least 80 cm$^3$/100 g but not more than 130 cm$^3$/100 g and a pH of at least 6.0 but not more than 9.0, and
    a carbon black (B) having a primary particle size of at least 30 nm but not more than 50 nm, a DBP absorption of at least 40 cm$^3$/100 g but less than 80 cm$^3$/100 g and a pH of at least 6.0 but not more than 9.0.

2. The non-aqueous ink according to claim 1, wherein the non-aqueous solvent comprises an alcohol-based solvent.

3. The non-aqueous ink according to claim 1, wherein a mass ratio between the carbon black (A) and the carbon black (B) is within a range from 9:1 to 4:6.

4. A printing method, comprising printing the non-aqueous ink according to claim 1 using an inkjet recording method.

5. A method of producing a non-aqueous ink, the method comprising a step of mixing:
    a carbon black (A) having a primary particle size of at least 18 nm but less than 30 nm, a DBP absorption of at least 80 cm$^3$/100 g but not more than 130 cm$^3$/100 g and a pH of at least 6.0 but not more than 9.0, and
    a carbon black (B) having a primary particle size of at least 30 nm but not more than 50 nm, a DBP absorption of at least 40 cm$^3$/100 g but less than 80 cm$^3$/100 g and a pH of at least 6.0 but not more than 9.0, and
    a non-aqueous solvent.

* * * * *